(12) United States Patent
Fujita et al.

(10) Patent No.: US 8,845,952 B2
(45) Date of Patent: Sep. 30, 2014

(54) METHOD OF MANUFACTURING HONEYCOMB STRUCTURE

(75) Inventors: Yuki Fujita, Gifu (JP); Koichi Uemura, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 318 days.

(21) Appl. No.: 13/242,943

(22) Filed: Sep. 23, 2011

(65) Prior Publication Data

US 2012/0080828 A1   Apr. 5, 2012

(30) Foreign Application Priority Data

Oct. 4, 2010   (WO) .................. PCT/JP2010/067390

(51) Int. Cl.
*C04B 38/00* (2006.01)
*C04B 111/00* (2006.01)

(52) U.S. Cl.
CPC ..... *C04B 38/0006* (2013.01); *C04B 2111/0081* (2013.01)
USPC ......................................................... 264/630

(58) Field of Classification Search
USPC ......................................................... 264/630
See application file for complete search history.

(56) References Cited

U.S. PATENT DOCUMENTS

| | | | |
|---|---|---|---|
| 4,996,015 A | | 2/1991 | Yoshimoto et al. |
| 2002/0140138 A1* | | 10/2002 | Wu et al. ........................ 264/630 |
| 2006/0292335 A1 | | 12/2006 | Ohno et al. |
| 2008/0317999 A1* | | 12/2008 | Patchett et al. ............... 428/116 |
| 2009/0291824 A1* | | 11/2009 | Ohno et al. ..................... 502/64 |

FOREIGN PATENT DOCUMENTS

| | | |
|---|---|---|
| EP | 1195198 A2 * | 4/2002 |
| EP | 1291061 | 3/2003 |
| EP | 1738814 | 1/2007 |
| EP | 2147722 | 1/2010 |
| EP | 2319604 | 5/2011 |
| JP | 01-294584 | 11/1989 |
| WO | WO 2009/141872 | 11/2009 |
| WO | WO 2009/141897 | 11/2009 |

OTHER PUBLICATIONS

Extended European Search Report for corresponding EP Application No. 11178800.6-2111, Dec. 6, 2011.

* cited by examiner

*Primary Examiner* — Alison Hindenlang
(74) *Attorney, Agent, or Firm* — Mori & Ward, LLP (57) ABSTRACT

A method of manufacturing a honeycomb structure including a honeycomb unit includes causing inorganic particles to contain water. The inorganic particles have a specific surface area of approximately 50 m$^2$/g or more. Raw material paste for the honeycomb unit is prepared. The raw material paste includes a molding aid, water, and the inorganic particles containing water. The raw material paste is molded into a honeycomb molded body. The honeycomb molded body is fired to obtain the honeycomb unit. The honeycomb unit have a plurality of cells extending from a first end face to a second end face of the honeycomb unit along a longitudinal direction of the honeycomb unit and is separated by a plurality of cell walls.

22 Claims, 5 Drawing Sheets

METHOD OF MANUFACTURING HONEYCOMB STRUCTURE

CROSS-REFERENCE TO RELATED APPLICATIONS

The present application claims priority under 35 U.S.C. §119 to International Application No. PCT/JP2010/067390, filed on Oct. 4, 2010. The contents of this application are incorporated herein by reference in their entirety.

BACKGROUND OF THE INVENTION

1. Field of the Invention

The present invention relates to a method of manufacturing a honeycomb structure.

2. Discussion of the Background

A large number of techniques have been developed in relation to conversion of automobile exhaust gas. With an increase in traffic, however, countermeasures taken against exhaust gas have hardly been satisfactory. Not only in Japan but also globally, is automobile emission control going to be further tightened.

In order to meet such control of exhaust gas, catalyst supports capable of treating predetermined components contained in exhaust gas are used in exhaust gas converting systems. Further, a honeycomb structure is known as a member for such catalyst supports.

Common honeycomb structures have a honeycomb unit. This honeycomb unit has, for example, multiple cells (through holes) extending from one end face to another end face of the honeycomb unit along its longitudinal directions, and these cells are separated from each other by cell walls supporting a catalyst or cell walls formed of a catalyst. Accordingly, in the case of causing exhaust gas to flow through a honeycomb structure having such a honeycomb unit, substances contained in the exhaust gas, such as HC, CO, and/or NOx, are converted by the catalyst supported by the cell walls or the catalyst forming the cell walls, so that these components in the exhaust gas may be treated.

In particular, in systems called SCR (Selective Catalytic Reduction) systems, it is possible to decompose NOx in exhaust gas into nitrogen and water using ammonia. For example, WO 09/141,897 A1 discloses a honeycomb structure having a honeycomb unit containing zeolite usable in SCR systems. The entire contents of WO 09/141,897 A1 are incorporated herein by reference.

A honeycomb unit of the conventional honeycomb structure of WO 09/141,897 A1 is formed by manufacturing a honeycomb molded body by subjecting raw material paste containing inorganic particles, an inorganic binder, an organic binder, a molding aid, water, etc., to extrusion molding and thereafter firing this honeycomb molded body.

SUMMARY OF THE INVENTION

According to an aspect of the present invention, a method of manufacturing a honeycomb structure including a honeycomb unit includes causing inorganic particles to contain water. The inorganic particles have a specific surface area of approximately 50 $m^2/g$ or more. Raw material paste for the honeycomb unit is prepared. The raw material paste includes a molding aid, water, and the inorganic particles containing water. The raw material paste is molded into a honeycomb molded body. The honeycomb molded body is fired to obtain the honeycomb unit. The honeycomb unit have a plurality of cells extending from a first end face to a second end face of the honeycomb unit along a longitudinal direction of the honeycomb unit and is separated by a plurality of cell walls.

BRIEF DESCRIPTION OF THE DRAWINGS

Other features and advantages of the present invention will become more apparent from the following detailed description when read in conjunction with the accompanying drawings, in which.

DESCRIPTION OF THE EMBODIMENTS

If the inorganic particles have multiple micropores to be relatively large in specific surface area (for example, in the case of having a specific surface area of approximately 50 $m^2/g$ or more), the phenomenon is likely to result that moisture and the molding aid enter micropores of the inorganic particles during the preparation of the raw material paste. It is difficult, however, to control the amounts of moisture and the molding aid to enter micropores of the inorganic particles in the raw material paste, and usually, the amounts of moisture and the molding aid to enter micropores of the inorganic particles are believed to differ from inorganic particle to inorganic particle.

It is believed that in the case of performing molding using such raw material paste where the amounts of moisture and the molding aid contained in micropores of the inorganic particles differ from inorganic particle to inorganic particle, the molded bodies obtained in respective molding processes are not stable in size. This is because differences in the amounts of moisture and the molding aid contained in micropores of the inorganic particles in the raw material paste are likely to prevent the amounts of moisture and the molding aid not contained in the micropores of the inorganic particles from being controlled, and the amounts of moisture and the molding aid not contained in the micropores of the inorganic particles contribute to the determination of the viscosity of the raw material paste. Particularly, in the case of using raw material paste having poor dispersibility because of reduced viscosity, it is believed that an uneven material distribution is likely to occur in the honeycomb structure finally obtained from a honeycomb molded body so that the honeycomb structure is likely to be prevented from having sufficient strength.

According to an embodiment of the present invention, it is possible to obtain a method of manufacturing a honeycomb structure having a honeycomb unit improved in size stability compared with the conventional ones.

The embodiments will now be described with reference to the accompanying drawings, wherein like reference numerals designate corresponding or identical elements throughout the various drawings.

Figure 1:
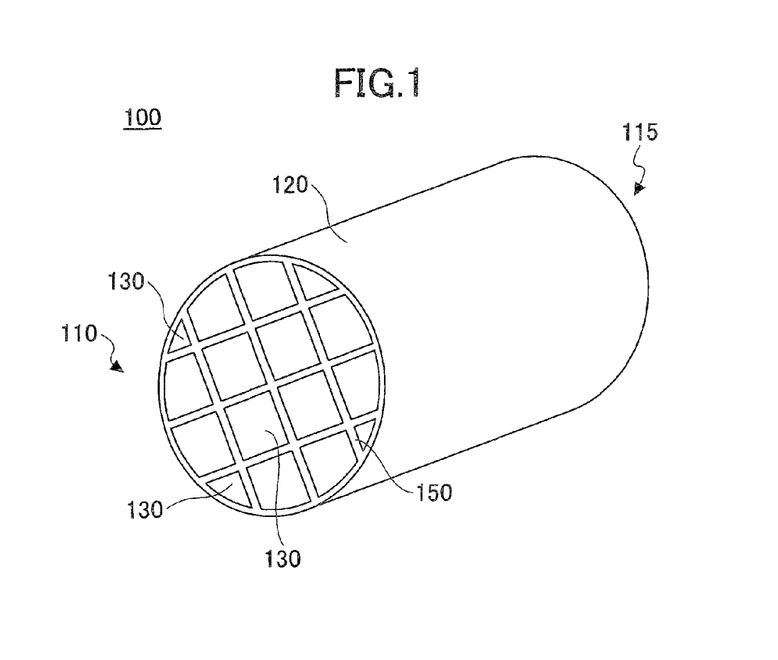
FIG. 1 is a schematic perspective view of a honeycomb structure manufactured according to an embodiment of the present invention.

FIG. 1 schematically illustrates a honeycomb structure manufactured according to an embodiment of the present invention. Further, FIG. 2 schematically illustrates a honeycomb unit, which is the basic unit of the honeycomb structure illustrated in FIG. 1.

As illustrated in FIG. 1, a honeycomb structure 100 has two end faces 110 and 115. Further, the honeycomb structure 100 has an outer peripheral coat layer 120 provided at its outer peripheral surface except for the end faces 110 and 115.

Figure 2:
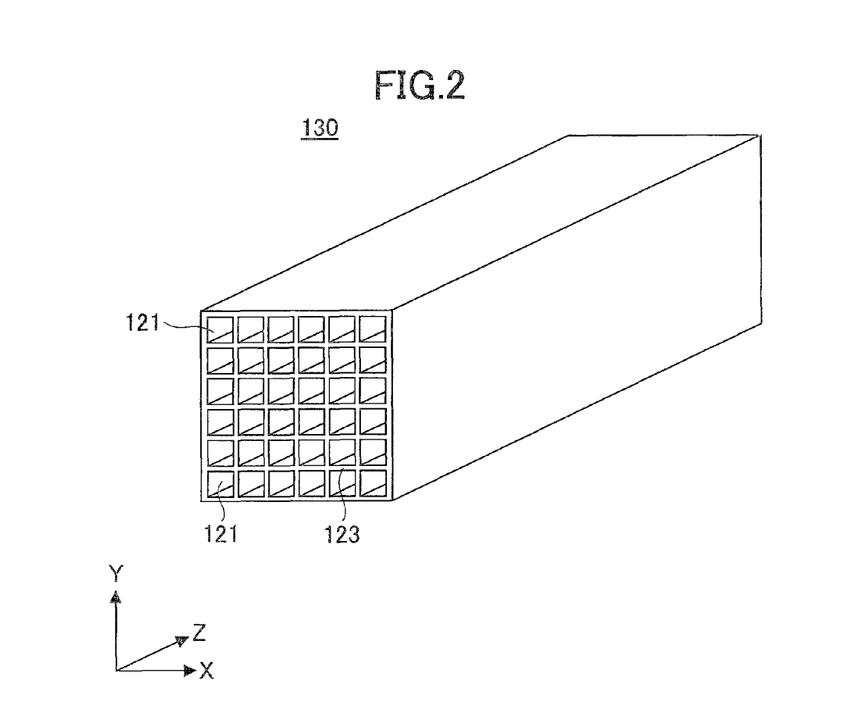
FIG. 2 is a schematic perspective view of a honeycomb unit of the honeycomb structure of FIG. 1 according to the embodiment of the present invention.

The honeycomb structure 100 is formed by, for example, joining multiple pillar ceramic honeycomb units 130 illustrated in FIG. 2 (16 units in a four-by-four matrix in the case of FIG. 1) by interposing an adhesive layer 150 and thereafter cutting the outer peripheral side along a predetermined shape (a substantially cylindrical shape in the case of FIG. 1).

As illustrated in FIG. 2, the honeycomb unit 130 includes multiple cells (through holes) 121, extending from one end to another end of the honeycomb unit 130 along its longitudinal directions and open at the end faces, and cell walls 123 separating the cells 121. In the non-limiting case of FIG. 2, the cross sections of the cells 121 perpendicular to the longitudinal directions (Z directions) are substantially square.

In the case of using alumina, silica, titania, ceria, zirconia, mullite, zeolite or the like as the inorganic particles included in a honeycomb unit, a honeycomb structure having such a honeycomb unit may be used as a catalyst support for converting CO, HC, and/or NOx. In particular, a catalyst support that uses zeolite as inorganic particles may be used for a urea SCR system having a urea tank.

For example, in such a urea SCR system, when exhaust gas is caused to flow through the system, the urea contained in the urea tank reacts with water in the exhaust gas to generate ammonia (Eq. (1)):

$$CO(NH_2)_2 + H_2O \rightarrow 2NH_3 + CO_2. \quad (1)$$

When this ammonia, together with exhaust gas including NOx, flows into each cell 121 from one of the end faces 110 and 115 (for example, the end face 110) of the honeycomb structure 100, the reactions of the following Eqs. (2-1) and (2-2) are caused by the action of the zeolite catalyst included in the cell walls 123:

$$4NH_3 + 4NO + O_2 \rightarrow 4N_2 + 6H_2O, \quad (2\text{-}1)$$

$$8NH_3 + 6NO_2 \rightarrow 7N_2 + 12H_2O. \quad (2\text{-}2)$$

Thereafter, the converted exhaust gas is discharged from another one of the end faces 110 and 115 (for example, the end face 115) of the honeycomb structure 100. Thus, by causing exhaust gas to flow inside the honeycomb structure 100, NOx in the exhaust gas can be treated.

The honeycomb unit 130 is manufactured by, for example, manufacturing a honeycomb molded body by subjecting raw material paste containing inorganic particles, a molding aid, and water as described above to extrusion molding, and thereafter firing this honeycomb molded body. The raw material paste may additionally contain an inorganic binder and/or an organic binder.

As illustrated in detail below, the method of manufacturing a honeycomb structure according to the embodiment of the present invention has the feature of causing inorganic particles to sufficiently contain water in the micropores of the inorganic particles in advance before the preparation of raw material paste. In this case, water has entered the micropores of the inorganic particles before the preparation of raw material paste, so that moisture and a molding aid are prevented from entering the micropores of the inorganic particles in the step of preparing raw material paste. Therefore, it is likely to be possible to avoid a problem in that moisture and a molding aid enter micropores of inorganic particles at random in the step of preparing raw material paste. As a result, the moisture and the molding aid fed in the step of preparing raw material paste are present outside the micropores of the inorganic particles. This makes it possible to control the viscosity of the raw material paste before molding.

Therefore, according to the method of manufacturing a honeycomb structure according to the embodiment of the present invention, it is likely to be possible to obtain honeycomb molded bodies with size stability improved among their respective molding processes, and the honeycomb structure is likely to be improved in size stability.

[Configuration of the Honeycomb Structure 100]

Here, a brief description is given of members of the honeycomb structure 100 illustrated in FIG. 1.

[Honeycomb Unit 130]

Here, a description is given in particular of the case where the honeycomb unit 130 is formed of a material including zeolite as a principal component. It is clear to a person having ordinary skill in the art, however, that at least part of the subsequent description may also be applied to the case where the honeycomb unit 130 is formed of other material such as γ-alumina.

The honeycomb unit 130 contains inorganic particles (zeolite) and an inorganic binder. Further, the honeycomb unit 130 may contain inorganic particles other than those of zeolite. The honeycomb unit 130 may further contain a strength reinforcing material such as inorganic fibers.

Examples of zeolite contained in the honeycomb unit 130 include β-zeolite, zeolite Y, ferrierite, zeolite ZSM-5, mordenite, faujasite, zeolite A, zeolite L, structural analogs of zeolite and the like. Preferred structural analogs of zeolite are ALPO (aluminophosphate), SAPO (silico-aluminophosphate) and the like. Further, zeolite may have Fe, Cu, Ni, Co, Zn, Mn, Ti, Ag, or V introduced therein through ion exchange. Of these elements, Fe or Cu is preferable in particular.

The inorganic binder contained in the honeycomb unit 130 is desirably a solids content of at least one selected from the group consisting of alumina sol, silica sol, titania sol, water glass, sepiolite, attapulgite, and boehmite.

The inorganic particles other than those of zeolite are desirably of alumina, silica, zirconia, titania, ceria, mullite and the like. These inorganic particles other than those of zeolite may be used alone or in combination.

Of the amount of the inorganic particles contained in the honeycomb unit 130, which consist of or include zeolite particles, the lower limit is desirably approximately 30 wt %, more desirably approximately 40 wt %, and still more desirably approximately 50 wt %, while the upper limit is desirably approximately 90 wt %, more desirably approximately 80 wt %, and still more desirably approximately 75 wt %. If the amount of the inorganic particles contained in the honeycomb unit 130 is more than or equal to 30 wt %, the amount of zeolite contributing to conversion is less likely to be relatively reduced. On the other hand, if the amount of the inorganic particles contained in the honeycomb unit 130 is less than or equal to 90 wt %, the inorganic binder contributing to the strength of the honeycomb unit 130 is less likely to be relatively reduced in amount, so that the strength of the honeycomb unit 130 is less likely to be reduced.

Further, in the case of adding inorganic fibers to the honeycomb unit 130, alumina, silica, silicon carbide, silica-alumina, glass, potassium titanate, aluminum borate or the like is desirable as the inorganic fibers. These may be used alone or in combination. Of the above-described inorganic fibers, alumina is more desirable.

The cell density of the honeycomb unit 130 is preferably in the range of approximately 15.5 to approximately 186 cells/cm$^2$ (approximately 100 to approximately 1200 cpsi), more preferably in the range of approximately 46.5 to approximately 170 cells/cm$^2$ (approximately 300 to approximately 1100 cpsi), and still more preferably in the range of approximately 62 to approximately 155 cells/cm$^2$ (approximately 400 to approximately 1000 cpsi).

The thickness of the cell walls 123 of the honeycomb unit 130 is not limited in particular, but has a desirable lower limit of approximately 0.1 mm in terms of strength and has a desirable upper limit of approximately 0.4 mm in terms of conversion performance.

The average pore size of the honeycomb unit 130 is preferably in the range of approximately 0.01 µm to approximately 1.0 µm. If the average pore size of the honeycomb unit 130 is more than or equal to approximately 0.01 µm, exhaust gas is likely to penetrate sufficiently into the cell walls 123 so that the conversion performance is less likely to be reduced. On the other hand, if the average pore size of the honeycomb unit 130 is less than or equal to approximately 1.0 µm, the contact points of the inorganic binder and the inorganic particles are less likely to be reduced, so that the strength of the honeycomb unit 130 is less likely to be reduced. The porosity of the honeycomb unit 130 is preferably approximately 20% to approximately 60%.

[Adhesive Layer 150]

The adhesive layer 150 of the honeycomb structure 100 is formed using adhesive layer paste as a raw material.

The adhesive layer paste is not limited in particular, and may be a mixture of an inorganic binder and inorganic particles, a mixture of an inorganic binder and inorganic fibers, a mixture of an inorganic binder, inorganic particles, and inorganic fibers, etc.

The adhesive layer paste may further contain an organic binder.

The organic binder is not limited in particular, and may be polyvinyl alcohol, methylcellulose, ethylcellulose, carboxymethylcellulose, etc. Two or more of them may be used together. A pore-forming agent such as balloons, which are minute hollow balls whose oxide component is oxide-based ceramic, spherical acryl particles, or graphite may be added as required to the adhesive layer paste.

Next, the adhesive layer paste is applied on the outer peripheral surfaces of honeycomb units 130, and the honeycomb units 130 are successively bonded. Drying is performed at approximately 120° C. for approximately 60 minutes to solidify the adhesive layer paste, thereby manufacturing an aggregate of the honeycomb units 130. At this point, the aggregate of the honeycomb units 130 may be cut into a substantially cylindrical shape and ground after its manufacture. The aggregate of the honeycomb units 130 having a substantially cylindrical shape may be manufactured by bonding honeycomb units 130 whose cross sections perpendicular to the longitudinal directions of the honeycomb units 130 are substantially fan-shaped, substantially square, etc.

The adhesive layer 150 is preferably approximately 0.3 mm to approximately 2.0 mm in thickness. If the adhesive layer 150 is more than or equal to approximately 0.3 mm in thickness, the joining strength of the honeycomb units 130 is likely to be sufficient. If the adhesive layer 150 is less than or equal to approximately 2.0 mm in thickness, the pressure loss of the honeycomb structure 100 is less likely to increase. The number of honeycomb units 130 to be joined is suitably determined in accordance with the size of the honeycomb structure 100.

[Outer Peripheral Coat Layer 120]

The outer peripheral coat layer 120 of the honeycomb structure 100 is formed using outer peripheral coat layer paste as a raw material. The peripheral coat layer paste is not limited in particular, and may be a mixture of an inorganic binder and inorganic particles, a mixture of an inorganic binder and inorganic fibers, a mixture of an inorganic binder, inorganic particles, and inorganic fibers, etc.

The peripheral coat layer paste may further contain an organic binder.

The organic binder is not limited in particular, and may be polyvinyl alcohol, methylcellulose, ethylcellulose, carboxymethylcellulose, etc., two or more of which may be used together.

Next, the outer peripheral coat layer paste is applied on the outer peripheral surface of the aggregate of the honeycomb units 130 cut into a predetermined shape (a substantially cylindrical shape in the case of FIG. 1). Drying is performed at 120° C. for 60 minutes to solidify the outer peripheral coat layer paste. Thereafter, the adhesive layer paste and the outer peripheral coat layer paste are degreased and solidified, so that the honeycomb structure 100 is manufactured.

The material of the outer peripheral coat layer 120 may be the same as or different from the material of the adhesive layer 150.

The final thickness of the outer peripheral coat layer 120 is preferably approximately 0.1 mm to approximately 2.0 mm. If the outer peripheral coat layer 120 is more than or equal to approximately 0.1 mm in thickness, the strength of the outer peripheral coat layer 120 is likely to be sufficient. Further, if the outer peripheral coat layer 120 is less than or equal to approximately 2.0 mm in thickness, the pressure loss of the honeycomb structure 100 is less likely to increase.

[Method of Manufacturing a Honeycomb Structure According to the Embodiment of the Present Invention]

A description is given in detail below of a method of manufacturing a honeycomb structure according to the embodiment of the present invention.

Figure 3:
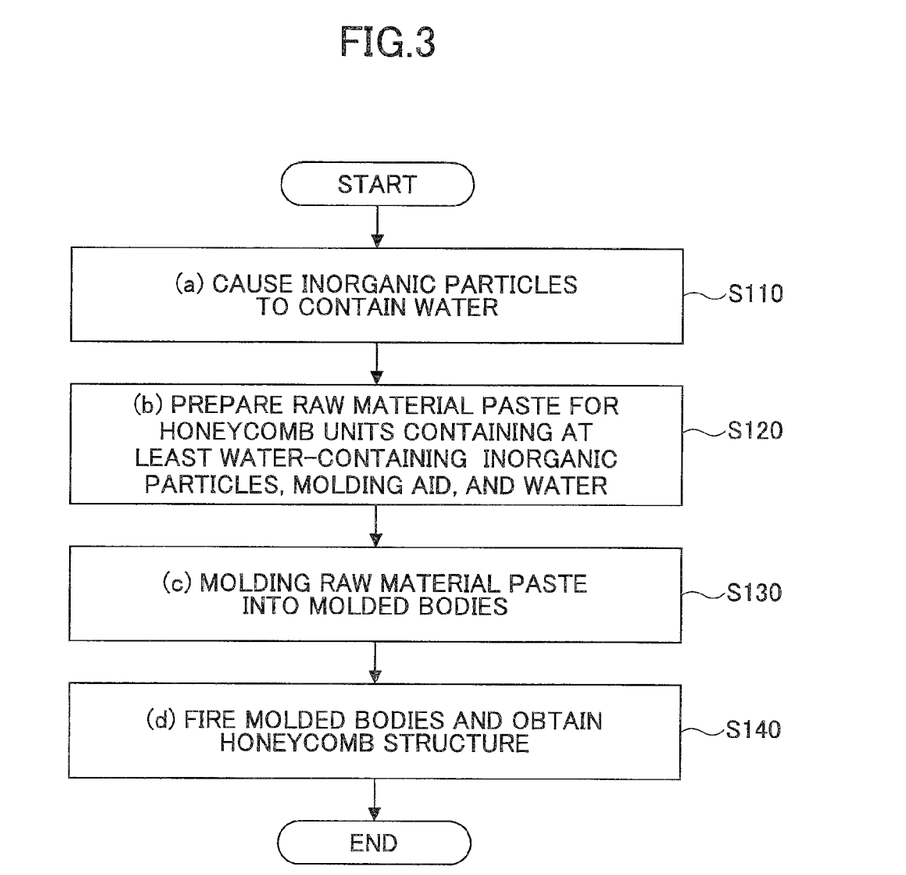
FIG. 3 is a flowchart of a method of manufacturing a honeycomb structure according to the embodiment of the present invention.

FIG. 3 illustrates a flowchart of a method of manufacturing a honeycomb structure according to the embodiment of the present invention. As illustrated in FIG. 3, the method of manufacturing a honeycomb structure according to the embodiment of the present invention includes:

(a) the process of causing inorganic particles to contain water (step S110);

(b) the process of preparing raw material paste for honeycomb units containing at least the above-described inorganic particles containing water, a molding aid, and water (step S120);

(c) the process of forming a honeycomb molded body by molding the raw material paste (step S130); and (d) the process of forming a honeycomb unit by firing the honeycomb molded body (step S140).

A description is given below of each of the processes.

[Step S110]

First, the process of causing inorganic particles to contain water in advance (hereinafter referred to as "water containing process") is performed.

The inorganic particles are not limited to but may be those of alumina, silica, titania, ceria, zirconia, mullite, zeolite or the like as described above.

The specific surface area of the inorganic particles is desirably approximately 50 m$^2$/g or more, and more desirably, approximately 100 m$^2$/g or more. While a larger specific surface area is more preferable, the upper limit of the specific surface area of the inorganic particles is, for example, approximately 600 m²/g. If the specific surface area of the inorganic particles is more than approximately 600 m²/g, the amounts of moisture and a molding aid to enter micropores of the inorganic particles increase to make it impossible to control the viscosity of raw material paste.

The water containing process may be executed in any manner as long as it is possible to cause water to be adsorbed on the inside of the micropores of the inorganic particles. For example, the water containing process may be executed by retaining the inorganic particles in a humidistat (constant temperature chamber) in which humidity and temperature are controlled.

In this case, the humidity (relative humidity) is preferably approximately 50% to approximately 90%, more preferably approximately 60% to approximately 85%, and still more preferably approximately 70% to approximately 80%. If the humidity (relative humidity) is more than or equal to approximately 50%, water is less likely to be adsorbed on the inside of the micropores of the inorganic particles at lower rates, so that it is less likely to take a longer time before a sufficient amount of water is adsorbed on the inside of the micropores of the inorganic particles. If the humidity (relative humidity) is less than or equal to approximately 90%, dew condensation is less likely to occur inside the humidistat and moisture is less likely to be adsorbed on the surfaces of the inorganic particles, thus making it possible to control the viscosity of raw material paste. Further, the temperature is preferably approximately 5° C. to approximately 60° C., more preferably approximately 10° C. to approximately 40° C., and still more preferably approximately 15° C. to approximately 30° C. If the temperature is more than or equal to approximately 5° C., part of the moisture inside the humidistat is less likely to be solidified, thus making it possible to cause water to be adsorbed on the inside the micropores of the inorganic particles. On the other hand, if the temperature is less than or equal to approximately 60° C., in the case of inorganic particles of zeolite, for example, the bonds of Si atoms and Al atoms forming zeolite are less likely to be partially broken during approximately 40 hours necessary for causing a sufficient amount of water to be adsorbed to the inside of the micropores of zeolite, so that the conversion performance is likely to be sufficient.

Further, in the case of employing zeolite as inorganic particles, for example, it is possible to cause zeolite particles to contain sufficient moisture by merely mixing the zeolite particles with a mixer or the like because zeolite is hygroscopic. The mixer is not limited to a particular type, and may be, for example, a ball mill, an impeller mixer, a blade mixer, a rotor mixer, etc.

The amount of water caused to be adsorbed on (contained in) the inorganic particles is, for example, preferably more than or equal to approximately 10 wt % relative to the weight of the inorganic particles, and more preferably a saturation amount.

Here, the "saturation amount" means the water content at the time when the micropores of the inorganic particles are substantially completely filled with water. The ratio of the saturation amount to the weight of the inorganic particles is defined as a saturation water percentage.

The saturation water percentage is determined by the following manner. After being placed in a drier at 120° C. for 2 hours, 2 kg of inorganic particles are placed in a humidistat at a temperature of 25° C. and a humidity of 80%, so that the inorganic particles are caused to contain moisture inside the humidistat. The weight of the inorganic particles containing water is measured at intervals of 1 hour, and the ratio of the contained water to the inorganic particles at the time when the rate of change of the weight of the water-containing inorganic particles is determined to be less than or equal to 0.3% per hour is determined as the saturation water percentage.

[Step S120]

Next, raw material paste for molding honeycomb units is prepared by mixing the inorganic particles subjected to the water containing process in step S110, a molding aid, and water. The raw material paste may additionally contain an inorganic binder and/or an organic binder.

The molding aid is not limited in particular, and may be, for example, ethylene glycol, dextrin, a fatty acid, fatty acid soap, polyalcohol, etc., of which two or more may be mixed. Of these, a fatty acid is desirable. Further, the fatty acid is preferably an unsaturated fatty acid, and more preferably a higher fatty acid. The higher fatty acid preferably has a carbon number more than or equal to 15 and less than 65.

The inorganic binder is not limited in particular, and is, for example, alumina sol, silica sol, titania sol, water glass, clay, kaolin, montmonrillonite, sepiolite, attapulgite, boehmite, etc. These may be used alone or in combination.

Of these, at least one selected from the group consisting of alumina sol, silica sol, titania sol, water glass, sepiolite, attapulgite, and boehmite is desirable.

The organic binder is not limited in particular, and is, for example, one or more organic binders selected from methylcellulose, carboxymethylcellulose, hydroxyethylcellulose, polyethylene glycol, phenolic resin, epoxy resin, etc. The amount of the organic binder blended is preferably approximately 1 to approximately 10 parts by weight to the total of 100 parts by weight of the inorganic particles and the inorganic binder.

The raw material paste is not limited to this, and is preferably subjected to mixing and kneading. For example, the raw material paste may be mixed using a mixer, an attritor, etc., and may be well kneaded with a kneader, etc.

[Step S130]

Next, honeycomb molded bodies are formed by molding the raw material paste. The molding of the raw material paste is not limited to a particular method, and is preferably performed by extrusion molding, etc., for example.

As described above, the inorganic particles contained in the raw material paste are subjected in advance to the water containing process before the preparation of the raw material paste. Therefore, the water containing conditions of the individual inorganic particles are believed to be kept substantially constant before the preparation of the raw material paste. As a result, in the raw material paste containing such inorganic particles, properties such as viscosity are believed to be constantly kept in substantially constant conditions. Accordingly, the honeycomb molded bodies formed using such raw material paste are always equal in size accuracy. This is likely to improve the size stability of a honeycomb structure to be finally obtained.

[Step S140]

Next, the honeycomb molded bodies obtained in the previous process are fired, so that honeycomb units are manufactured.

The conditions for firing differ depending on the kind of the inorganic particles contained in the molded bodies. The firing temperature is preferably in the range of, for example, approximately 600° C. to approximately 1200° C.

If the firing temperature is more than or equal to approximately 600° C., condensation polymerization through the inorganic binder is likely to progress so that the strength of the honeycomb units is less likely to be reduced. On the other hand, if the firing temperature is less than or equal to approximately 1200° C., the sintering of zeolite is prevented from excessively progressing so that the reaction sites of zeolite are less likely to be reduced.

In the case of manufacturing such a honeycomb structure as illustrated in FIG. 1, the multiple honeycomb units manufactured in the above-described process are joined by interposing adhesive layer paste.

The adhesive layer paste is not limited in particular, and may be a mixture of inorganic particles and an inorganic binder, a mixture of an inorganic binder and inorganic fibers, a mixture of inorganic particles, an inorganic binder, and inorganic fibers, etc. An organic binder may be further added to this.

The organic binder is not limited in particular, and may be one or more selected from polyvinyl alcohol, methylcellulose, ethylcellulose, carboxymethylcellulose, etc. Among organic binders, carboxymethylcellulose is desirable.

A necessary number of honeycomb units are joined into an assembly by interposing the adhesive layer paste. Thereafter, the outer peripheral surface of the assembly is cut, for example, substantially cylindrically using a diamond cutter or the like as required. As a result, a honeycomb structure of a desired shape is manufactured.

The honeycomb structure may have an outer peripheral coat layer provided at its outer peripheral surface if necessary.

By the above-described processes, it is possible to manufacture a honeycomb structure having such a configuration as illustrated in FIG. 1.

In the above description, features of the embodiment of the present invention are described taking the honeycomb structure 100 formed by joining multiple honeycomb units 130 by interposing the adhesive layer 150 as an example.

The embodiment of the present invention, however, may also be applied to a honeycomb structure of a so-called "monolithic structure", which is formed of a single honeycomb unit.

Figure 4:
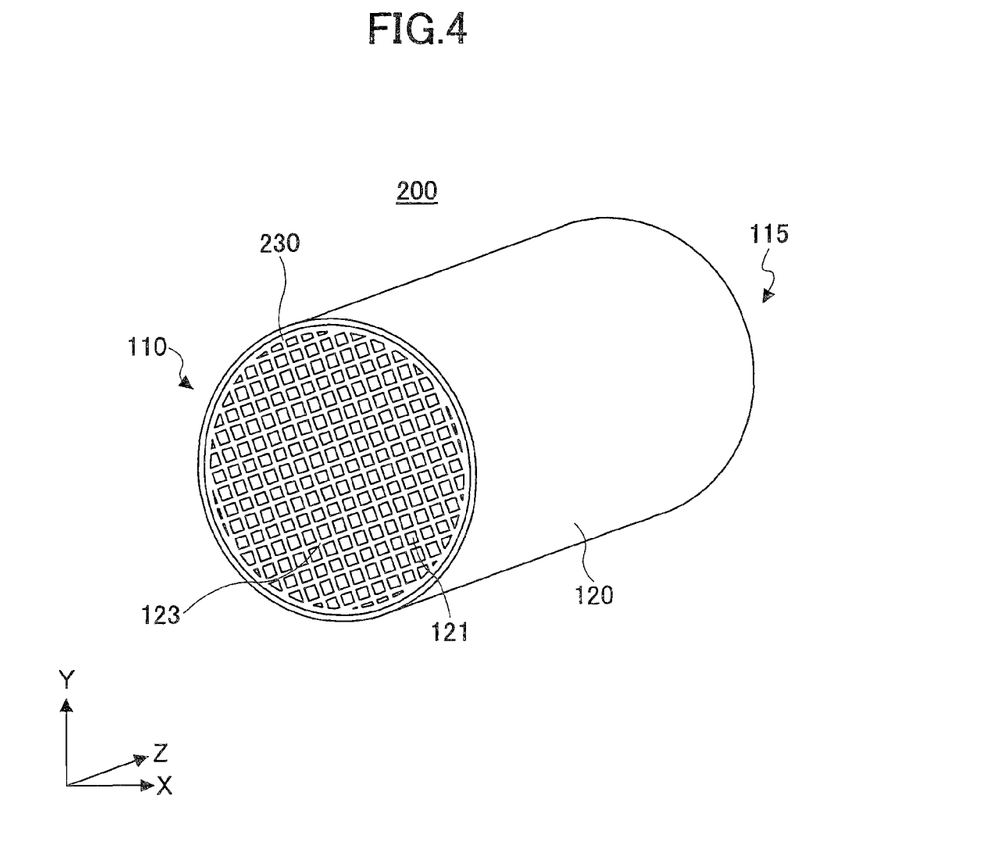
FIG. 4 is a schematic perspective view of another honeycomb structure manufactured according to the embodiment of the present invention.

FIG. 4 schematically illustrates another honeycomb structure manufactured according to the embodiment of the present invention.

FIG. 4 illustrates a honeycomb structure 200 of such a "monolithic structure." In FIG. 4, the same members as those of FIG. 1 are given the same reference numerals as in FIG. 1.

The honeycomb structure 200 has the two end faces 110 and 115. Further, usually, the honeycomb structure 200 has the outer peripheral coat layer 120 provided at its outer peripheral surface except for the end faces 110 and 115.

Here, unlike the above-described honeycomb structure 100, the honeycomb structure 200 is formed of a single honeycomb unit 230.

The honeycomb unit 230 includes the multiple cells 121, extending from one end to another end of the honeycomb unit 230 along its longitudinal directions and open at the end faces, and the cell walls 123 separating the cells 121. In the non-limiting case of FIG. 4, the cross sections of the cells 121 perpendicular to the longitudinal directions (Z directions) are substantially square.

It is clear to a person having ordinary skill in the art that in the honeycomb structure 200 thus constructed as well, the effects of the present invention are produced by applying the above-described method of manufacturing a honeycomb structure according to the embodiment of the present invention.

EXAMPLE

A description is given in detail of the present invention based on an example.

Multiple honeycomb molded bodies were manufactured by the following process, and the variation in size of the honeycomb molded bodies was evaluated.

First, multiple plastic trays having respective bottom surfaces of 390 mm×550 mm were filled with β-zeolite powder (with secondary particles having an average particle size of 5 μm) even in level. These plastic trays were kept in a humidistat for 100 hours or more. The temperature and the humidity (relative humidity) inside the humidistat were 25° C. and 80%, respectively.

Next, raw material paste for honeycomb molded bodies was made. The raw material paste was prepared by mixing 3450 g of the above-described β-zeolite powder kept in the humidistat and subjected to a water containing process, 650 g of alumina fibers (6 μm in average fiber diameter and 100 μm in average fiber length), 840 g of boehmite as an inorganic binder, 330 g of methylcellulose as an organic binder, 330 g of a fatty acid as a molding aid, and 1580 g of ion-exchanged water.

Next, the obtained raw material paste was subjected to extrusion molding using a screw molding machine, thereby manufacturing 40 raw honeycomb molded bodies of 35 mm×35 mm×150 mm in size. The cell walls of the raw honeycomb molded bodies were 0.275 mm in thickness, and the cell density of the raw honeycomb molded bodies was 400 cpsi.

[Size Measurement]

The size of each of the obtained raw honeycomb molded bodies was measured. The size measurement was performed using a displacement sensor manufactured by KEYENCE CORPORATION as follows.

Figure 5:
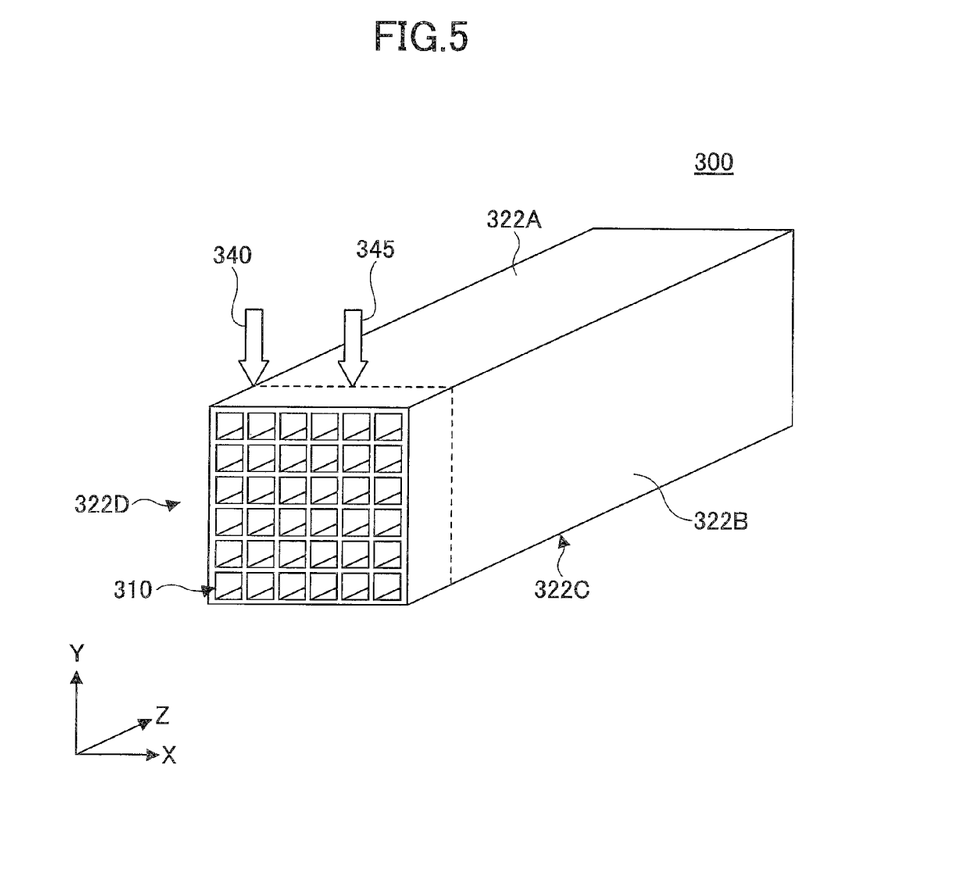
FIG. 5 is a schematic diagram illustrating size measuring positions of a honeycomb molded body according to the embodiment of the present invention.

FIG. 5 schematically illustrates size measuring positions of a honeycomb molded body.

First, as illustrated in FIG. 5, a honeycomb molded body 300 is placed on a table with a side surface 322C facing downward. Next, the absolute height of the honeycomb molded body 300 is measured at its corner part indicated by arrow 340 and its center part indicated by arrow 345 near an end face 310 on an upper side surface 322A of the honeycomb molded body 300. The positions of arrow 340 and arrow 345 are at 10 mm (indicated by a dotted line in FIG. 5) from the end face 310 of the honeycomb molded body 300. Further, the size measurement was performed immediately after (within 10 minutes from) the extrusion molding of the honeycomb molded body 300.

A "displacement" is defined by Eq. (3) as follows:

$$\text{Displacement(mm)} = \text{the absolute height(mm) of the corner part} - \text{the absolute height(mm) of the center part.} \quad (3)$$

The displacement may be either a positive value or a negative value. The displacement is a positive value if the absolute height of the corner part is more than the absolute height of the center part, and is a negative value in the opposite case.

The orientation of the placement of the honeycomb molded body 300 is changed, and the same measurement is performed with respect to a side surface 322B, the side surface 322C, and a side surface 322D.

Such a measurement was performed with respect to all of the 40 honeycomb molded bodies. The number of measurements is 160.

As a result of the measurements, the minimum value of displacement was −0.10 mm, and the maximum value of displacement was +0.20 mm. Thus, the variation of displacement is 0.30 mm, which shows that the variation in size of the obtained honeycomb molded bodies is limited.

The standard deviation (σ) of the displacement was determined with respect to each of the side surfaces 322A through 322D of the honeycomb molded bodies (the number of measurements is 40 each). As a result, the standard deviation of the displacement is in the range of 0.048 mm to 0.063 mm with respect to each of the side surfaces 322A through 322D, thus showing that the standard deviation is limited.

The results obtained in the example are collectively illustrated in Table 1.

according to the embodiment of the present invention are likely to be improved in size stability compared with the conventional ones.

According to the above-described embodiment, the specific surface area of inorganic particles may be determined by the multipoint BET (Brunauer-Emmett-Teller) method, and the average pore size of a honeycomb unit may be determined by mercury intrusion porosimetry.

TABLE 1

| EXAMPLES | MINIMUM DISPLACEMENT VALUE | MAXIMUM DISPLACEMENT VALUE | DISPLACEMENT VARIATION | STANDARD DEVIATION OF DISPLACEMENT | | | |
|---|---|---|---|---|---|---|---|
| | | | | $1^{ST}$ SIDE SURFACE | $2^{ND}$ SIDE SURFACE | $3^{RD}$ SIDE SURFACE | $4^{TH}$ SIDE SURFACE |
| EXAMPLE | −0.10 mm | +0.20 mm | 0.30 mm | 0.048 mm | 0.054 mm | 0.063 mm | 0.048 mm |
| COMPARATIVE EXAMPLE | −0.30 mm | +0.15 mm | 0.45 mm | 0.057 mm | 0.068 mm | 0.073 mm | 0.066 mm |

Comparative Example

Multiple honeycomb molded bodies were manufactured in the same manner as in the example, and the variation in size of the honeycomb molded bodies was evaluated.

In this comparative example, however, β-zeolite powder was subjected to no water containing process. The paste for molded bodies was prepared by mixing 3000 g of β-zeolite powder, 650 g of alumina fibers (6 μm in average fiber diameter and 100 μm in average fiber length), 840 g of boehmite as an inorganic binder, 330 g of methylcellulose as an organic binder, 330 g of a fatty acid as a molding aid, and 2200 g of ion-exchanged water. The other preparation conditions are the same as in the example.

The size measurement was performed in the above-described process with respect to 40 raw honeycomb molded bodies obtained. The obtained results are illustrated in Table 1.

According to these results, in the comparative example, the minimum value of displacement was −0.30 mm and the maximum value of displacement was +0.15 mm. Further, the variation of the displacement is 0.45 mm, which shows that the variation in size of the obtained molded bodies is greater in the comparative example. Further, the standard deviation (σ) of the displacement is more than or equal to 0.057 mm, which is the smallest, thus showing that the standard deviation is greater.

Figure 6:
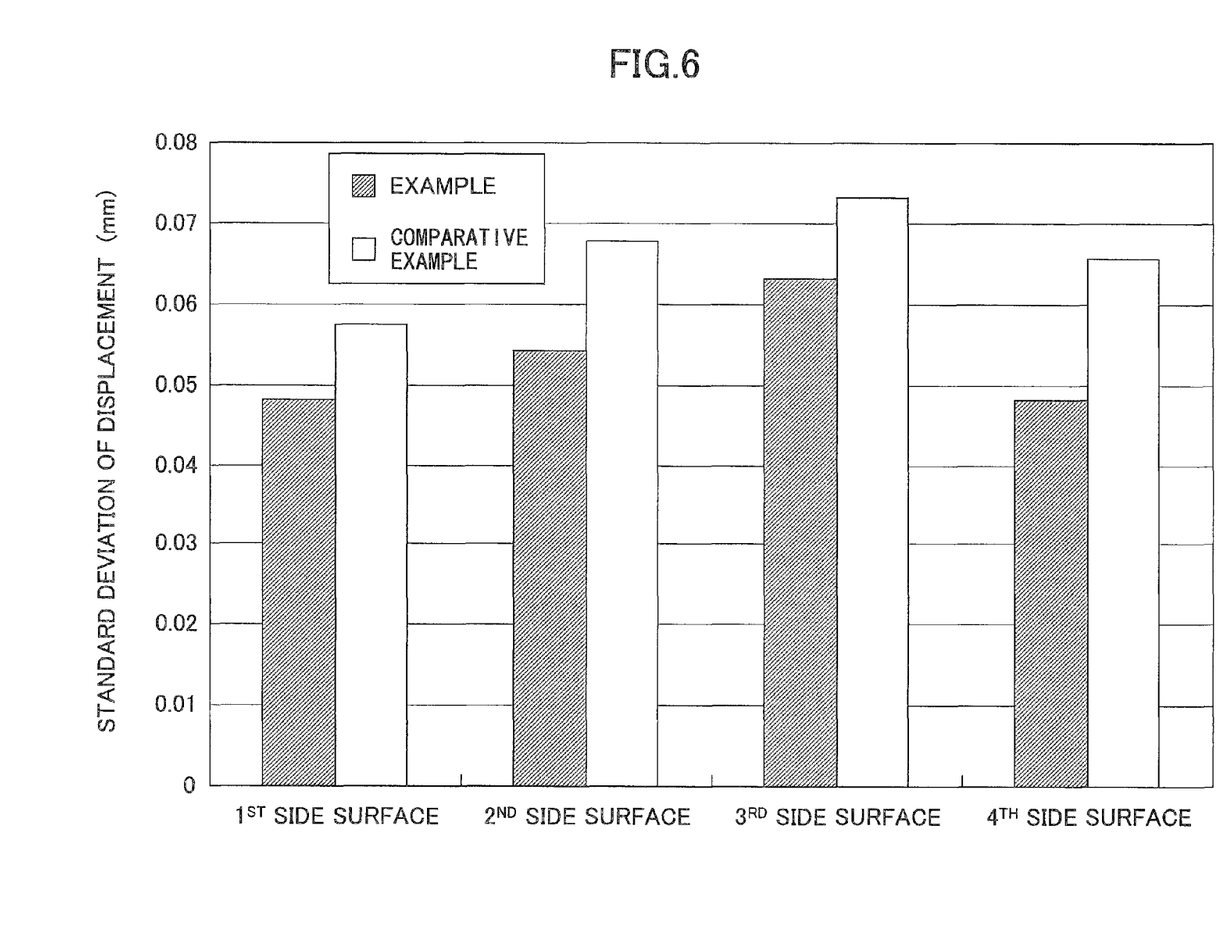
FIG. 6 is a graph illustrating the standard deviations of the displacements of side surfaces in an example and a comparative example in comparison according to the embodiment of the present invention.

FIG. 6 illustrates a graph comparing the standard deviations of the displacements of the respective side surfaces 322A through 322D in the example and the comparative example.

Table 1 and FIG. 6 show that the standard deviation of the displacement is significantly smaller in the honeycomb molded bodies in the example than in the honeycomb molded bodies in the comparative example with respect to any of the side surfaces 322A through 322D of the raw honeycomb molded body 300.

Thus, it is found that the honeycomb molded bodies manufactured in the manner according to the example are significantly reduced in displacement variation compared with the honeycomb molded bodies manufactured in the manner according to the comparative example. This result shows that a honeycomb unit and a honeycomb structure manufactured by the method of manufacturing a honeycomb structure Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a honeycomb structure including a honeycomb unit, the method comprising:
    forming water-containing inorganic particles by adding first water to inorganic particles so that the water-containing inorganic particles contain 10 wt % or more of the first water, the inorganic particles having a specific surface area of approximately 50 m$^2$/g or more;
    preparing raw material paste for the honeycomb unit by adding second water to the water-containing inorganic particles and a molding aid;
    molding the raw material paste into a honeycomb molded body; and
    firing the honeycomb molded body to obtain the honeycomb unit, the honeycomb unit having a plurality of cells extending from a first end face to a second end face of the honeycomb unit along a longitudinal direction of the honeycomb unit and separated by a plurality of cell walls.

2. The method of manufacturing a honeycomb structure as claimed in claim 1, wherein the inorganic particles are caused to contain the first water of a saturation amount.

3. The method of manufacturing a honeycomb structure as claimed in claim 1, wherein the inorganic particles are caused to contain the first water by retaining the inorganic particles in a humidistat.

4. The method of manufacturing a honeycomb structure as claimed in claim 1, wherein the inorganic particles are caused to contain the first water by retaining the inorganic particles in an environment of an approximately 50% to approximately 90% humidity and an approximately 5° C. to approximately 60° C. temperature.

5. The method of manufacturing a honeycomb structure as claimed in claim 1, wherein the inorganic particles contain zeolite.

6. The method of manufacturing a honeycomb structure as claimed in claim 5, wherein the inorganic particles are caused to contain the first water by mixing the inorganic particles with a mixer.

7. The method of manufacturing a honeycomb structure as claimed in claim 6, wherein the mixer is one of a ball mill, an impeller mixer, a blade mixer, and a rotor mixer.

8. The method of manufacturing a honeycomb structure as claimed in claim 5, wherein the zeolite is one selected from a group consisting of β-zeolite, zeolite Y, ferrierite, zeolite ZSM-5, mordenite, faujasite, zeolite A, zeolite L, and a structural analog of zeolite.

9. The method of manufacturing a honeycomb structure as claimed in claim 8, wherein the zeolite includes the structural analog of zeolite, and the structural analog of zeolite is one of aluminophosphate (ALPO) and silico-aluminophosphate (SAPO).

10. The method of manufacturing a honeycomb structure as claimed in claim 5, wherein the zeolite is ion-exchanged with one selected from a group consisting of Fe, Cu, Ni, Co, Zn, Mn, Ti, Ag, and V.

11. The method of manufacturing a honeycomb structure as claimed in claim 5, wherein
the inorganic particles include inorganic particles other than the zeolite, and
the inorganic particles other than the zeolite include at least one selected from a group consisting of alumina, silica, zirconia, titania, ceria, and mullite.

12. The method of manufacturing a honeycomb structure as claimed in claim 11, wherein an amount of the inorganic particles containing the zeolite contained in the honeycomb unit is in a range of approximately 30 wt % to approximately 90 wt %.

13. The method of manufacturing a honeycomb structure as claimed in claim 1, wherein the honeycomb unit has an average pore size of approximately 0.01 μm to approximately 1.0 μm.

14. The method of manufacturing a honeycomb structure as claimed in claim 1, wherein the raw material paste further contains at least one of an inorganic binder and an organic binder.

15. The method of manufacturing a honeycomb structure as claimed in claim 1, wherein the honeycomb structure is formed by joining a plurality of the honeycomb units by interposing an adhesive layer.

16. The method of manufacturing a honeycomb structure as claimed in claim 1, wherein the inorganic particles include at least one selected from a group consisting of alumina, silica, zirconia, titania, ceria, mullite, and zeolite.

17. The method of manufacturing a honeycomb structure as claimed in claim 1, wherein the inorganic particles have a specific surface area of approximately 100 $m^2/g$ to approximately 600 $m^2/g$.

18. The method of manufacturing a honeycomb structure as claimed in claim 1, wherein the honeycomb molded body is fired at a temperature of approximately 600° C. to approximately 1200° C.

19. The method of manufacturing a honeycomb structure as claimed in claim 1, wherein the honeycomb structure is formed of a single honeycomb unit.

20. The method of manufacturing a honeycomb structure as claimed in claim 1, wherein the honeycomb structure has one end face and another end face, the method further comprising:
providing an outer peripheral coat layer defining an outer peripheral surface of the honeycomb structure except for the one end face and the another end face of the honeycomb structure.

21. The method of manufacturing a honeycomb structure as claimed in claim 1, wherein the water-containing inorganic particles are formed by adding the first water to the inorganic particles in order for the first water to enter micropores of the inorganic particles before the preparing of the raw material paste.

22. The method of manufacturing a honeycomb structure as claimed in claim 1, wherein the water-containing inorganic particles are formed by adding the first water to the inorganic particles in order for the first water to enter micropores of the inorganic particles before the preparing of the raw material paste to prevent the molding aid from entering the micopores during the preparing of the raw material.

* * * * *